(12) United States Patent
Flax

(10) Patent No.: US 7,882,705 B2
(45) Date of Patent: Feb. 8, 2011

(54) WATER COOLER

(76) Inventor: Gary Errol Flax, 94, 11th Street, Parkmore, 2196 Sandton (ZA)

( * ) Notice: Subject to any disclaimer, the term of this patent is extended or adjusted under 35 U.S.C. 154(b) by 1246 days.

(21) Appl. No.: 10/570,793

(22) PCT Filed: Sep. 6, 2004

(86) PCT No.: PCT/ZA2004/000105

§ 371 (c)(1),
(2), (4) Date: Mar. 6, 2006

(87) PCT Pub. No.: WO2005/030634

PCT Pub. Date: Apr. 7, 2005

(65) Prior Publication Data

US 2006/0248901 A1 Nov. 9, 2006

(30) Foreign Application Priority Data

Sep. 5, 2003 (ZA) .................................. 2003/6951

(51) Int. Cl.
*F25B 21/02* (2006.01)

(52) U.S. Cl. .......................................... 62/3.64; 62/389
(58) Field of Classification Search ................... 62/3.6, 62/389, 3.64
See application file for complete search history.

(56) References Cited

U.S. PATENT DOCUMENTS

| | | | |
|---|---|---|---|
| 5,139,666 A * | 8/1992 | Charbonneau et al. ...... 210/264 |
| 5,567,322 A | 10/1996 | Rundle et al. |
| 6,561,382 B2 * | 5/2003 | Shelton .......................... 222/1 |
| 2002/0040585 A1 | 4/2002 | Chaney |
| 2002/0070153 A1 * | 6/2002 | Bowler ........................ 210/245 |
| 2002/0134715 A1 | 9/2002 | Tanner et al. |

* cited by examiner

*Primary Examiner*—Melvin Jones
(74) *Attorney, Agent, or Firm*—Morgan, Lewis & Bockius LLP

(57) ABSTRACT

A water cooler (10) comprises an internal tank (400) that is normally connected to an inverted reservoir (200) and to a delivery spout (122). A cup shaped filter (300) is placed in the water passage (138, 152, 402) leading from the reservoir to the tank. The filter contains filtration material. It also has microscopic openings (323) in its cover and base (306) through which water passes into and out of a filter cup.

19 Claims, 12 Drawing Sheets

WATER COOLER

This is a U.S. National Phase Entry of PCT Application No. PCT/ZA2004/000105, filed Sep. 6, 2004, with a priority date of Sep. 5, 2003, based upon Application No. ZA 2003/6951 filed in South Africa.

This invention relates to a water cooler.

This invention is concerned with a water cooler of the kind comprising a tank that is connected to an outlet spout from which water is dispensed, a water passage leading to the tank, and a support on which an inverted water reservoir may be placed to deliver water to the cooler, the support including an inlet that in use is connected to the reservoir and that communicates with the water passage to deliver water to the tank. Such water cooler is hereinafter referred to as "a water cooler of the kind set forth".

According to one aspect of the invention there is provided a water cooler of the kind set forth further comprising a removable filter located between the port and the inlet. The cooler preferably includes a cup shaped receptacle in which the filter is releasably received. The filter too comprises a cup shaped member having a cover thereon and with a base therebelow, within which member filtration media is received. The filter and the receptacle both normally comprise bases and these two bases are preferably slightly spaced so that water passing through the filter will be received on the base of the receptacle. The base of the receptacle is preferably provided with an outlet opening that is connected to the inlet on the tank.

At the top of the receptacle there is conveniently an upwardly directed surface and the filter preferably has a surrounding flange which rests on the surface to support the filter within the receptacle. The outer edge of the flange is preferably upwardly inclined to give the flange a degree of flexibility so as to seal effectively against the upwardly directed surface.

The water cooler is adapted for use with a reservoir having an outlet mouth which incorporates delivery ports within which is a normally closed closure valve that is movable to an open position in which it exposes the delivery ports, wherein the filter is shaped with an upwardly projecting portion that is capable of engaging the closure valve to move it into the open position when the reservoir is placed in position on the cooler. The filter conveniently comprises a cover member of which the centre portion constitutes the said projecting portion. An axially extending reinforcing pillar is conveniently provided in the filter to reinforce the projecting portion.

The tank is preferably formed with two upwardly projecting tubes preferably formed integrally therewith, one of the tubes being at the centre of the tank with its mouth constituting the inlet and the second tube at the side of the tank and open near the base of the tank to constitute a delivery tube. The delivery tube being connected by a flexible pipe to the said controllable outlet.

A cooling device is preferably provided adjacent the tank. This cooling device is preferably a Peltier cooler having a cooling plate that draws heat from the contents of the tank. The tank is conveniently formed with an enlarged aperture in which the cooling plate is received.

Conveniently the water cooler comprises an overflow tank connected to the water reception chamber so that when excess water enters the water reception chamber this is conveyed to the overflow tank. The support preferably comprises a cover for the overflow tank and is preferably movable relative to the main body to expose the interior of the tank for cleaning.

According to another aspect of the invention there is provided a water reservoir for use with a water cooler as described above, the water reservoir having an enlarged outlet mouth within which is a closure valve incorporating a valve member that is movable from a sealing position to an open position in which it permits water to flow through the valve. Preferably the valve has a wall having openings therein and the valve member when in the sealing position is downstream of the openings and seals against the wall and when in the open position is upstream of the opening so that water in the reservoir can escape through the openings.

Conveniently the wall comprises upper and lower portions on either side of the openings there being columns extending preferably axially between the said wall portions and between which the openings are formed. The columns preferably taper inwardly towards the centre of the wall. The wall and valve member are preferably formed separately of the reservoir and suitably connected thereto for example by having an inwardly directed threaded surface which is threaded on to the outwardly threaded mouth.

According to a further aspect of the invention there is provided the combination of a cooler as set out above with a water reservoir as set out above.

Embodiments of the invention will now be described by way of example with reference to the accompanying drawings.

In the drawings:—

Figure 3:
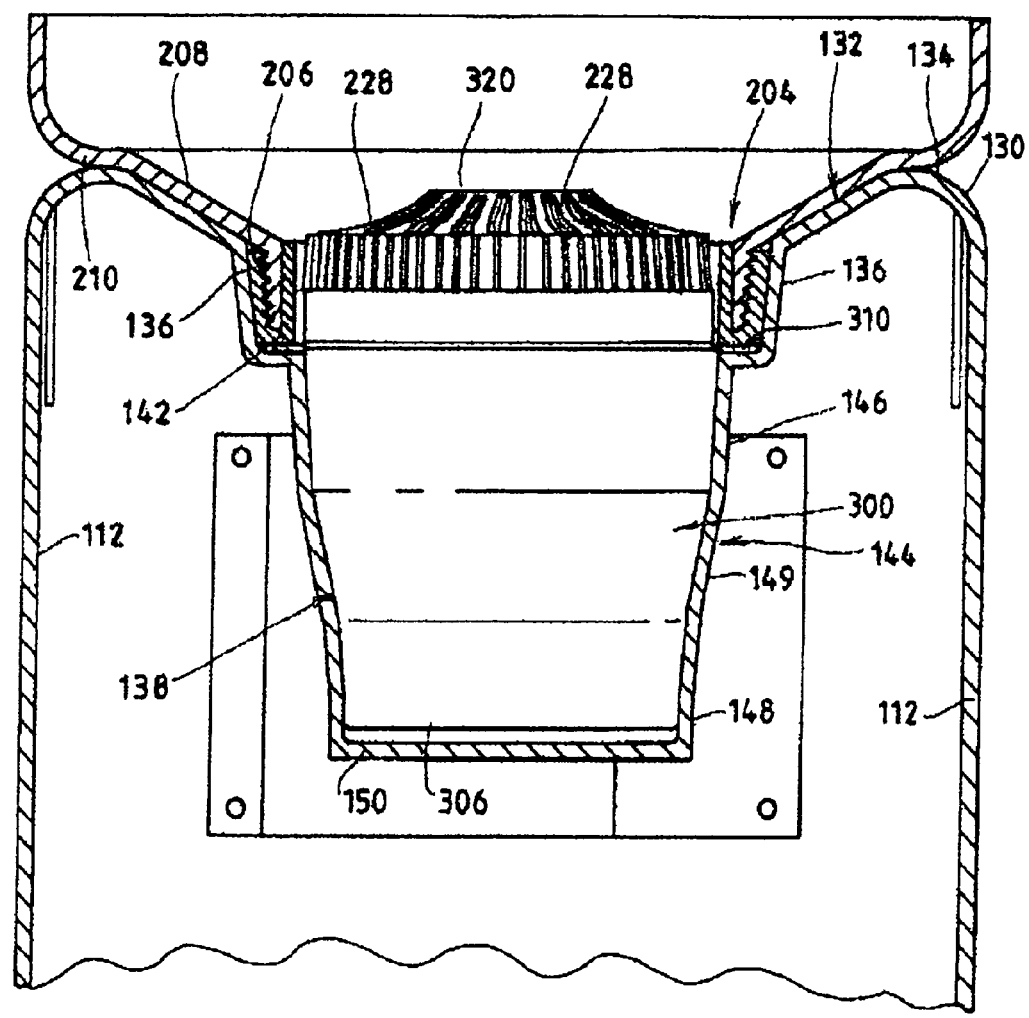
Figure 4:
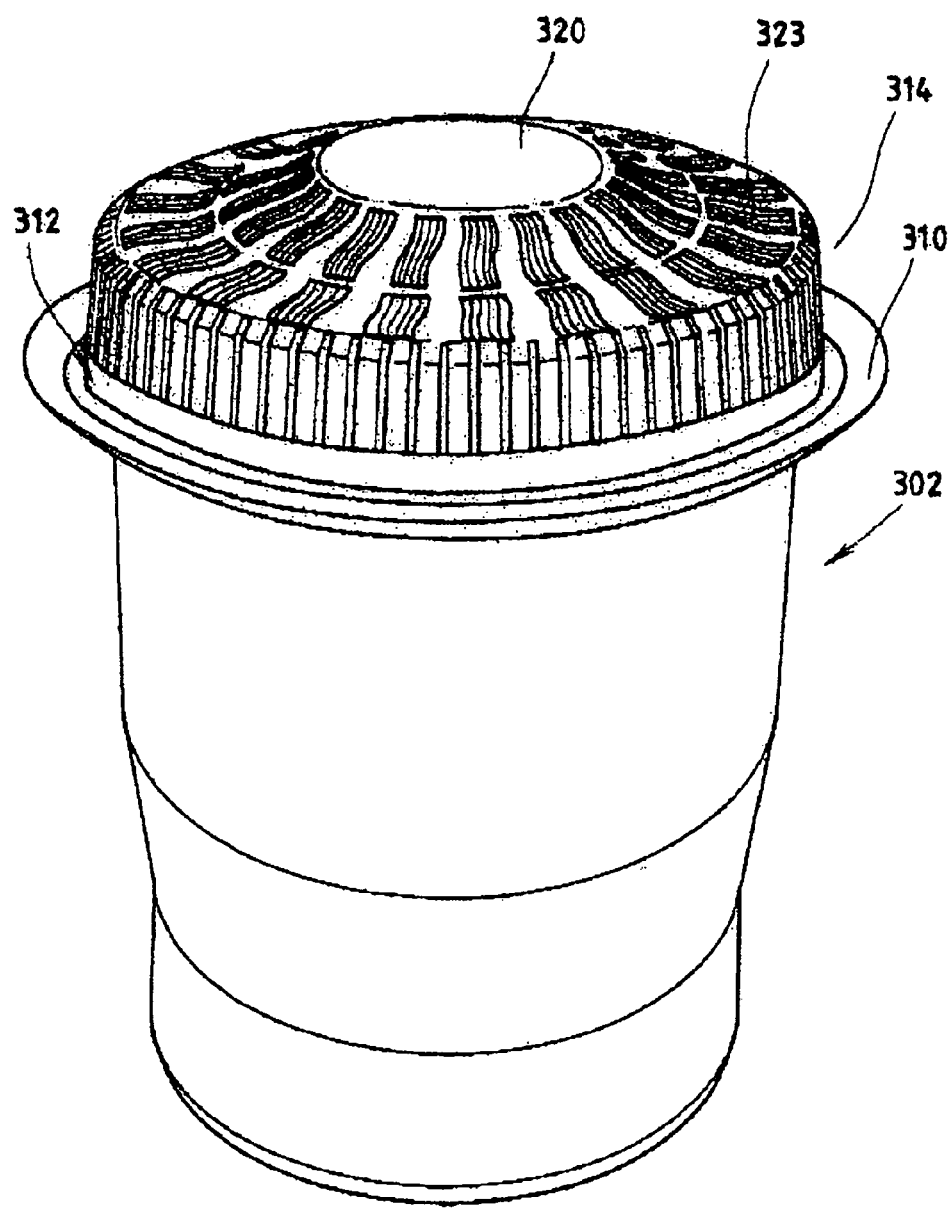
Figure 5:
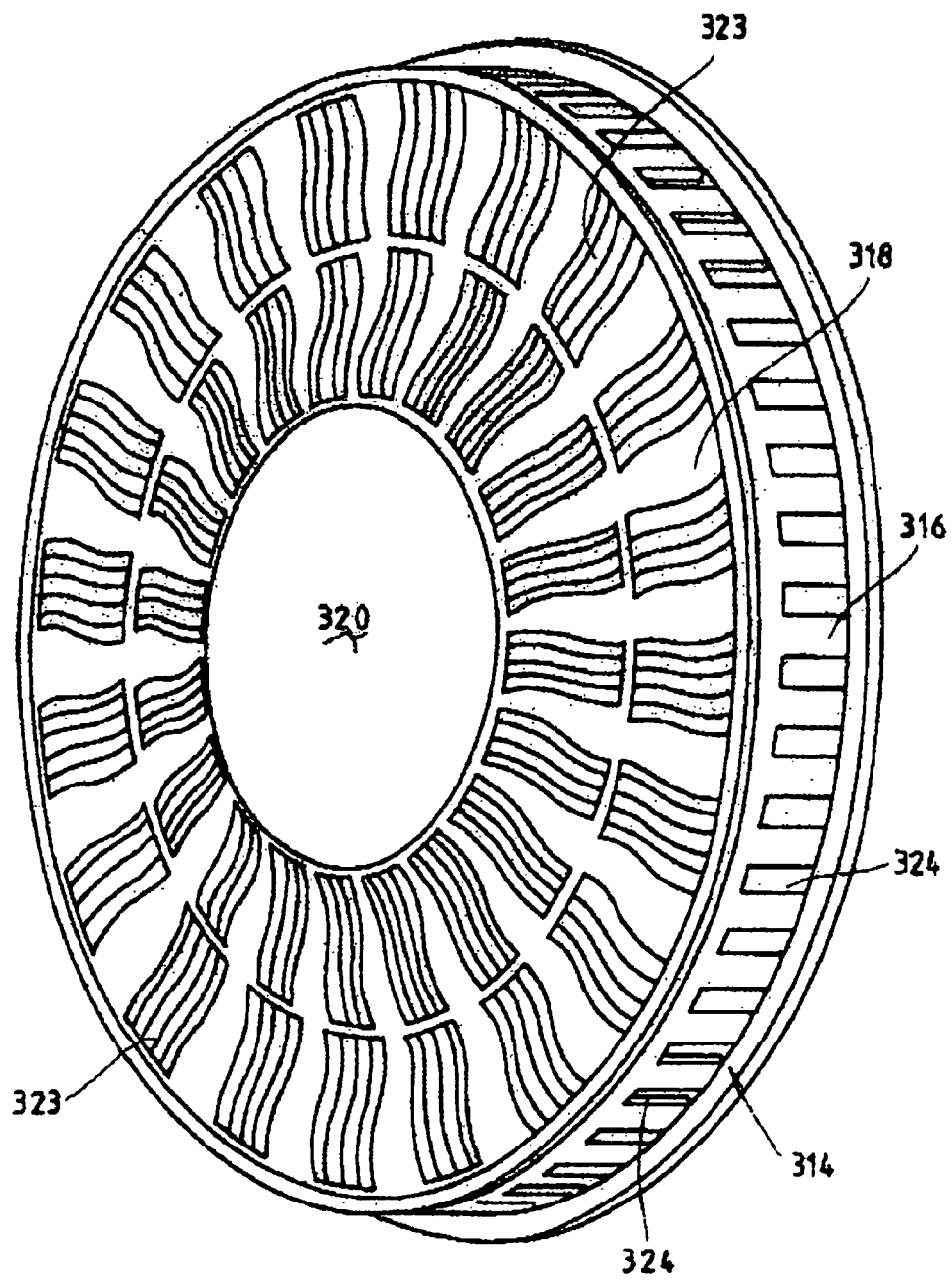
Figure 6:
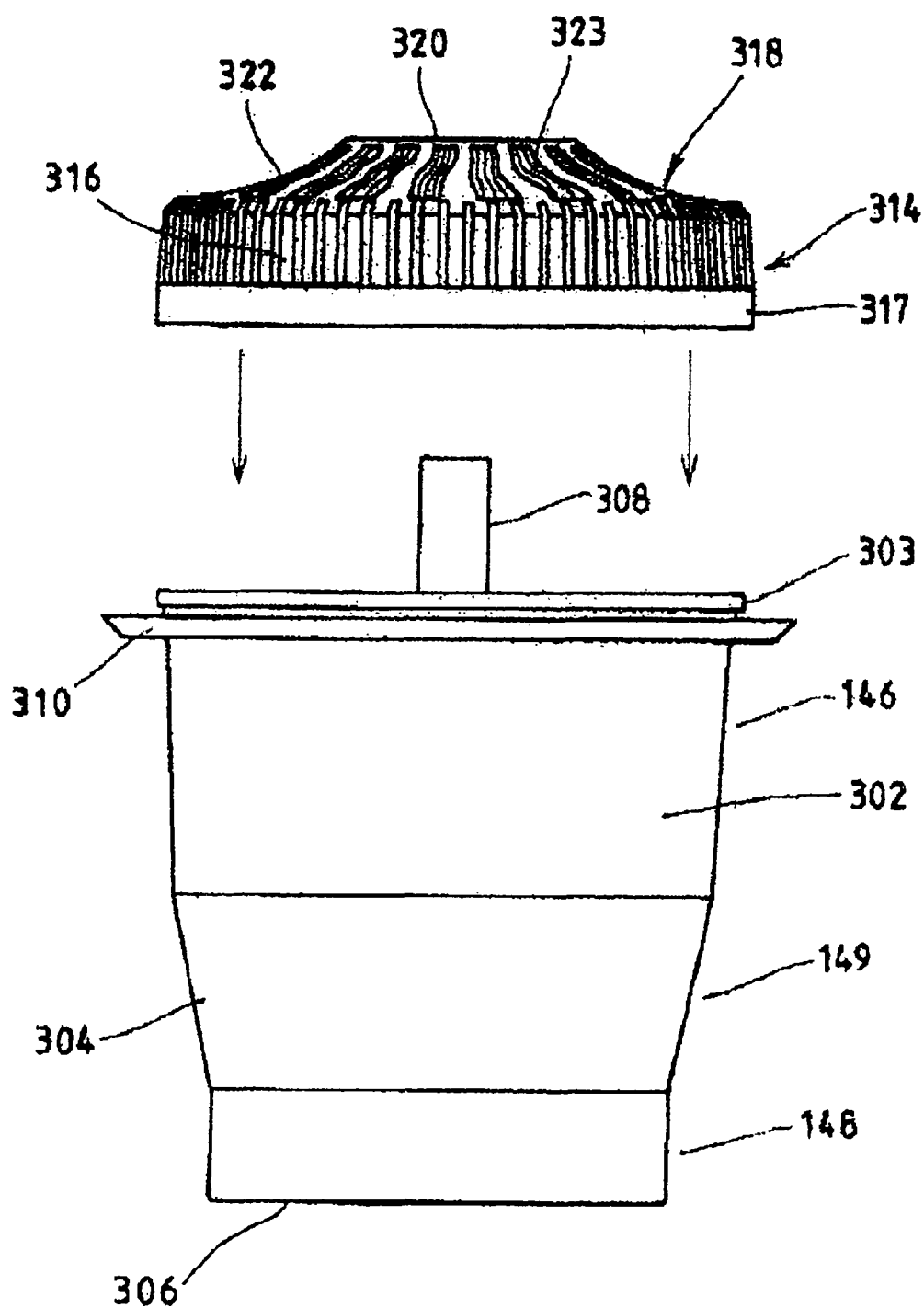
Figure 7:
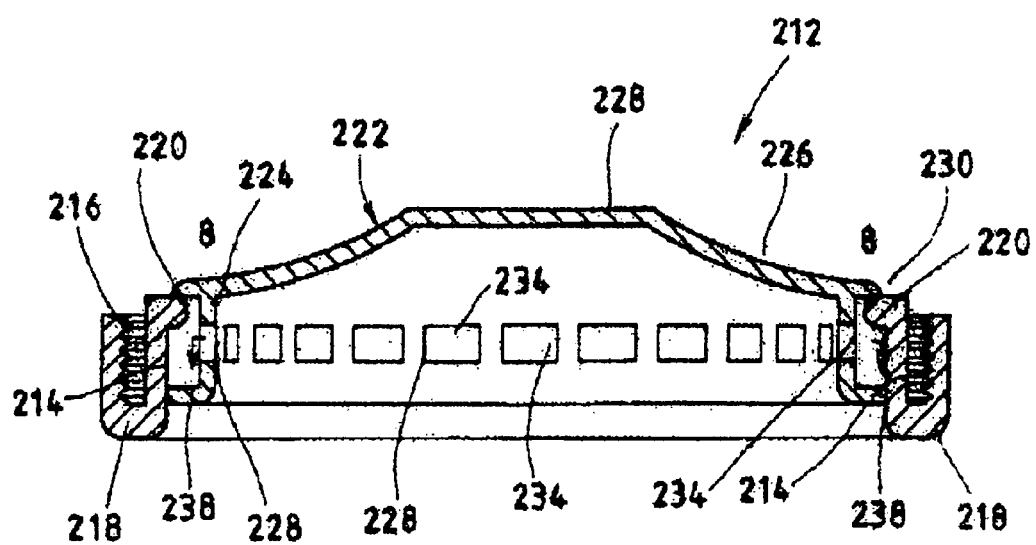
Figure 8:
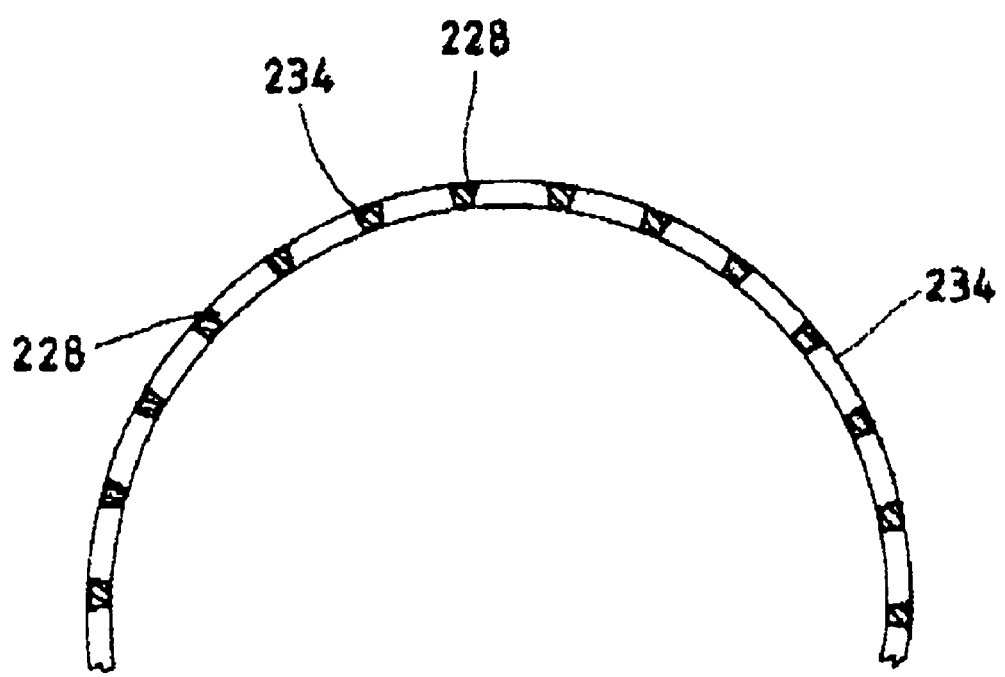
Figure 9:
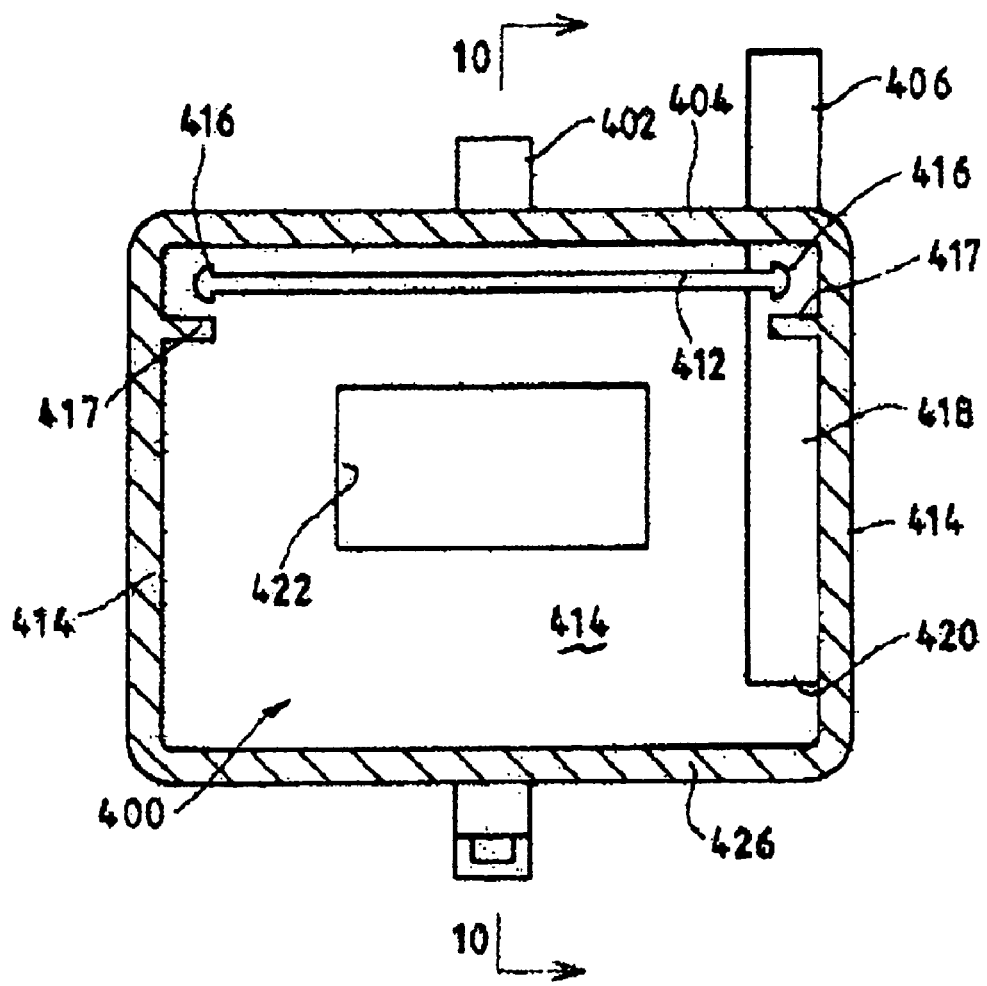
Figure 10:
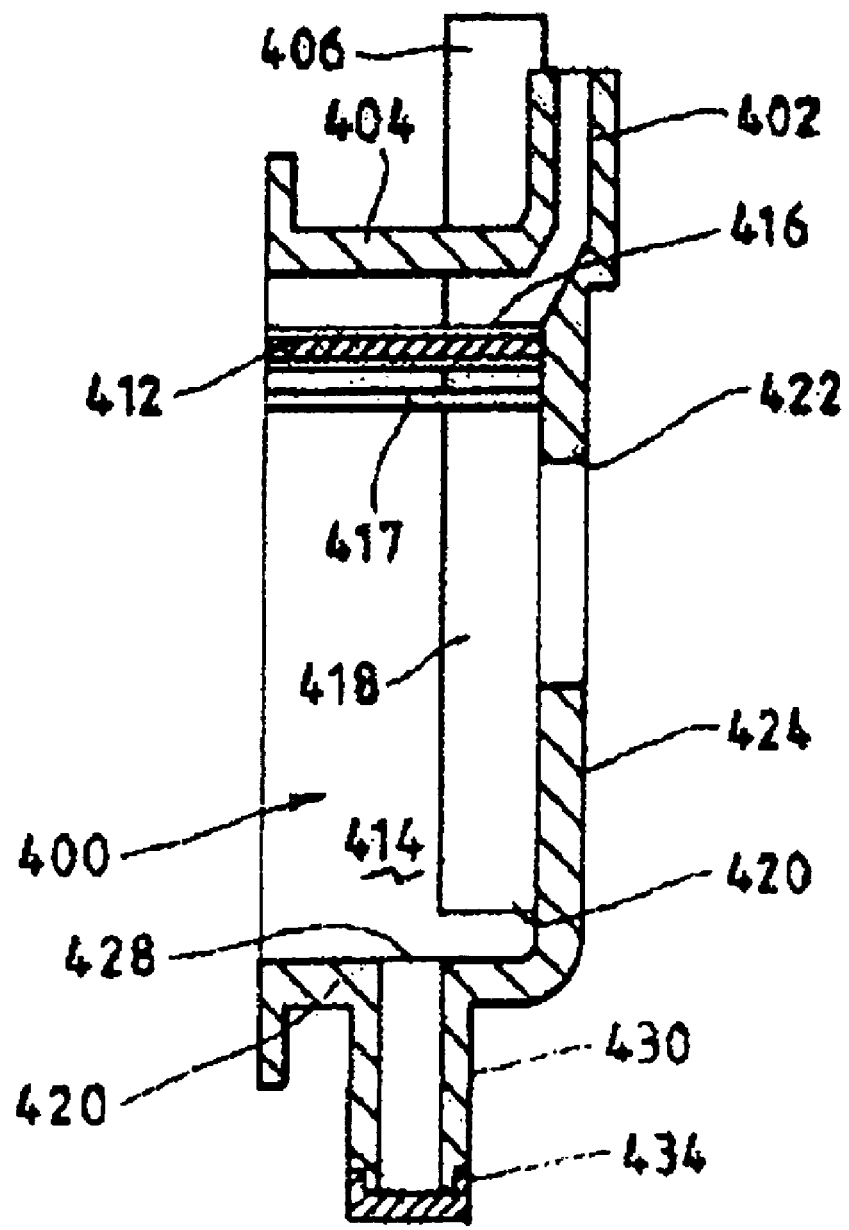
Figure 11:
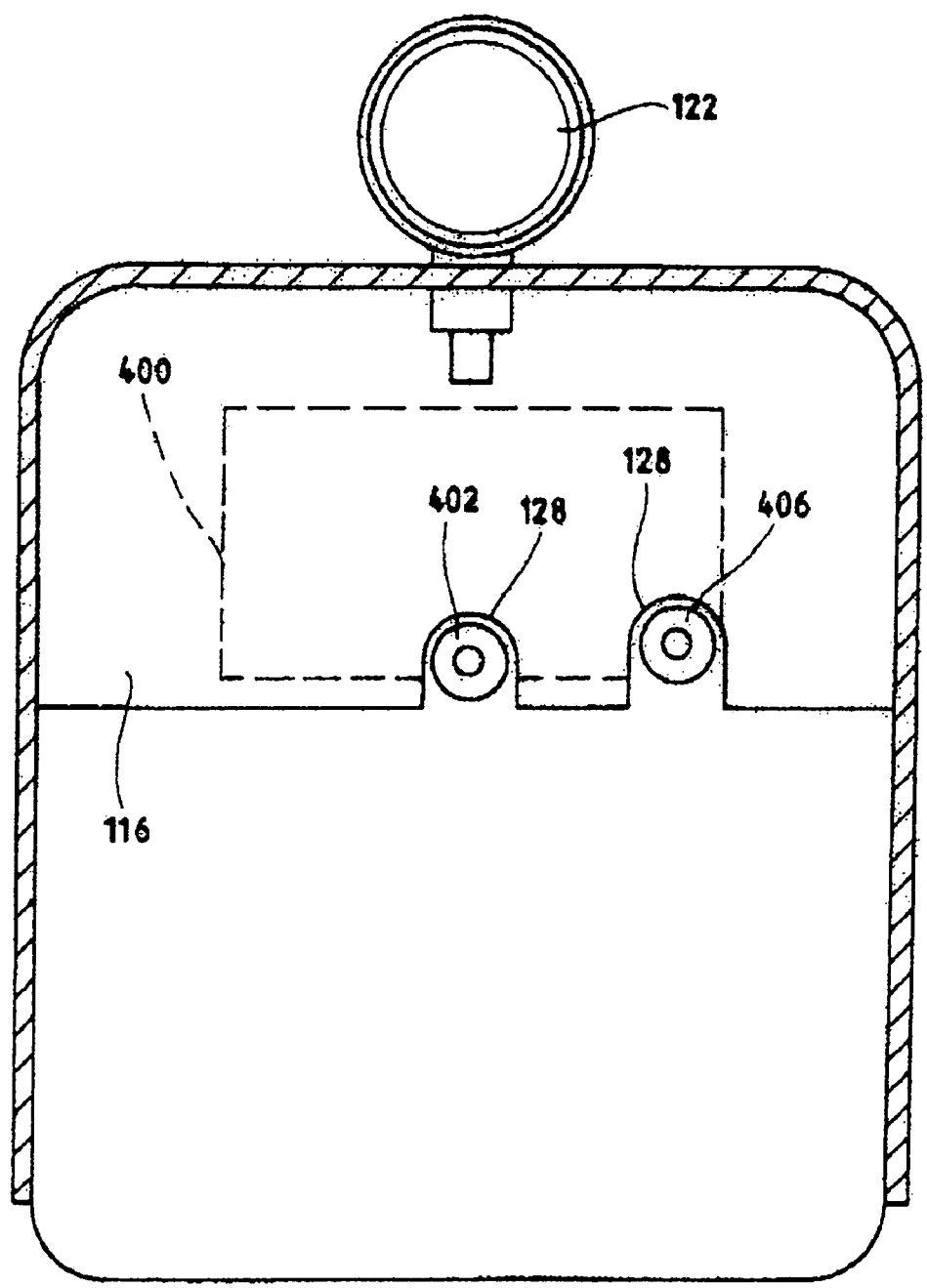

FIG. 3 is an enlarged detail section through the cooler at the location of the filter, FIG. 4 is a perspective view of a filter, FIG. 5 is an enlarged perspective view from above of the filter cap, FIG. 6 is an exploded side view of a filter housing, FIG. 7 is an enlarged transverse section through the closure member for the reservoir mouth with the valve shown in the sealing position, FIG. 8 is a detail section on line 8-8 of FIG. 7 showing the shape of the columns, FIG. 9 is a front view of the chiller tank, FIG. 10 is a section on line 10-10 of FIG. 9, and FIG. 11 is a transverse section though the cooler showing the separating shelf.

Figure 12:
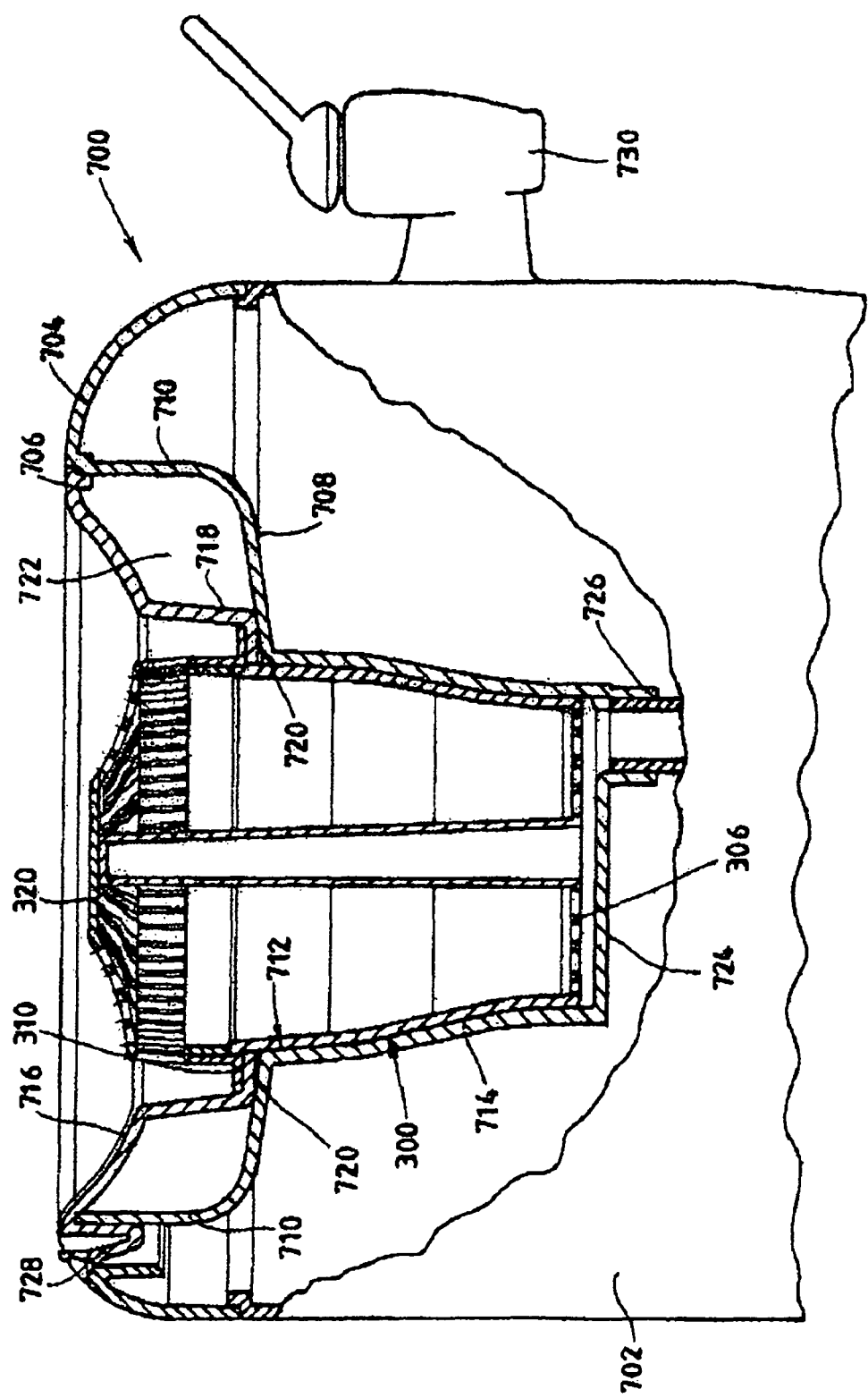

FIG. 12 is a side view partially in section of the upper part of a modified water cooler of the invention.

Referring now to FIGS. 1 to 11, there is shown a miniature water cooler 10 comprising a main unit 100 and a removable water reservoir 200.

The main unit 100 includes a housing 102 which consists of three moulded plastic members 104, 106 and 108. There is a one piece moulded front member 104 consisting of a base 110, two side walls 112 and a front 114 with the rear open. A top member 108 covers the housing 102. A rear closure plate 106 is provided.

Within the housing 102 is an inwardly directed shelf 116 leading from the front wall 114. Below the shelf 116 is a water chiller tank 400. Near the top of the front wall 114 is a central dispensing outlet spout 122 with a valve operating lever 124 and a spigot 126 that passes through the front wall 114. The chiller tank 400, which will be described more fully below, has a central inlet tube 402 from the top wall 404 (see FIGS. 7 and 9) and a dispensing tube 406 extending upwardly from one corner. The dispensing tube 406 is connected by a flexible pipe (not shown) to the spigot 126 of the dispensing valve 122. Slots 128 (see FIG. 11) are provided in the edge of the shelf 116 to accommodate the tubes 402 and 406.

The top member 108 comprises side members 130 which are rounded to merge smoothly and in an aesthetically pleasing manner with a top surface 132. Within the top surface 132 is an inwardly and downwardly directed concave lead-in portion 134 which leads to a cylindrical aperture 136 and which defines a water reception chamber. A shallow radial ventilating groove 137 is provided in the upper face of the lead-in portion 134 Below the aperture 136 is a generally cup shaped filter receptacle 138 the upper end 140 of which is spaced from the aperture 136 by an upwardly directed annular surface 142. The receptacle 138 has a side wall 144 which is formed as a surface of revolution comprising an upper cylindrical portion 146 and a lower cylindrical portion 148 joined by a curved portion 149. The receptacle 138 has a base 150 near one side of which is a hollow outlet boss 152 that fits over the end of the inlet tube 402 of the tank 120. The receptacle 138, boss 152 and tube 402 form a water passage leading to the tank 400 with the mouth of the receptacle forming the inlet thereto.

Releasably received within the receptacle 138 is a filter 300. The filter 300 comprises a filter cup 302 the side walls 304 of which are generally the same shape as those of the receptacle 138 although of a smaller size. The base 306 of the cup 302 is generally flat. When the filter cup 302 is received within the receptacle 138, the base 306 is spaced from the base 150 by a few millimeters. Extending upwardly from the base 306 of the filter cup 302 and formed integrally therewith is a hollow reinforcing pillar 308 the purpose of which will be described more fully below.

Near to the upper end of the filter cup 302 is an outwardly directed flange 310 (best shown in FIG. 4). The flange 310 is upwardly curved so that its upper surface forms a groove 312 for the purpose which will be described. This flange 310 seats on the annular surface 142 of the receptacle 138. Above the flange 310, the filter cup 302 receives a clip on cover member 314. The cover member 314 consists of a cylindrical side wall 316 and an upper surface 318 which has a central smaller flat part 320 with a concave skirt 322 leading to the upper end of the wall 316. The upper surface 318 is provided with fine openings 323 arranged in wavy formations through which water can pass (best shown in FIG. 5). The lower part 317 of the side wall 316 is an unperforated cylinder which in use fits over and covers the end 303 of the cup 302 above the flange 310. Axially extending openings 324 are formed in the upper part of the wall 316. These openings lead to the water reception chamber and thence to the interior of the filter cup 302. The base 306 of the filter cup 302 also has very small or microscopic openings (not shown) through which the water can pass.

Filter media, not shown, is contained within the filter cup 302 surrounding the pillar 308.

The small openings 324 in the cover member 314 and those in the base 306 of the cup serve as a mechanical filters which operates with the chemical filtration of the filter media to provide well filtered water.

It will be appreciated that the filter 300 is located in the water passage between the inlet thereto and the tank and provides filtered water to the tank for subsequent delivery through the spout.

The tank 400 comprises a front portion 410 with a rear closure part to form a parallipipedal member which fits closely behind the front wall 114 of the housing 102 and below the shelf 116. The front portion 410 has a diffusing plate 412 (see FIGS. 9 and 10) located below the inlet tube 402 and extending to near the sides 414 of the tank 400. The ends 416 of the plate 412 are rounded so that water can pass therearound in a controlled manner. A small flange 417 is formed on each side member 414 closely below the space between the rounded end 416 of the plate 412 and the sides 414 so that water entering into the tank will do so in a smooth and controlled manner.

As mentioned above, the dispensing tube 406 is provided at one corner of the tank 400. The tube 406 is a continuation of an internal part 418 which has an opening 420 at the lower end of the tank. A rectangular opening 422 is provided in the rear wall 424 of the tank 400. In the lower wall 426 of the tank 400 is an opening 428 leading to a spigot 430 which the end of which is of reduced outer diameter and which passes through an opening 432 in the base 154 of the front member 104. A removable closure cap 434 (not shown in FIG. 2) is provided on the reduced portion of the spigot 430.

Figure 1:
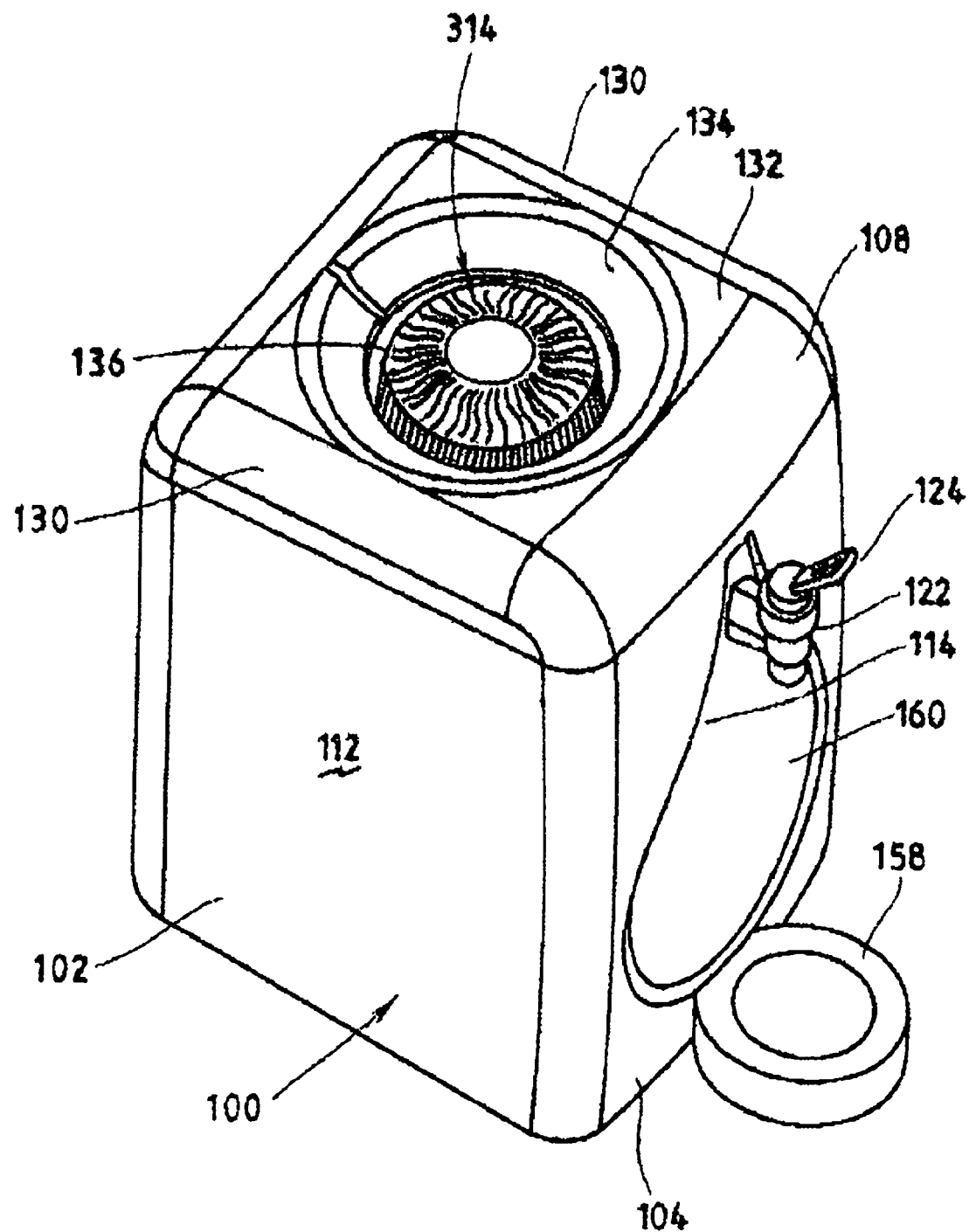
FIG. 1 is a perspective view of the main unit of a cooler of the invention.
Figure 2:
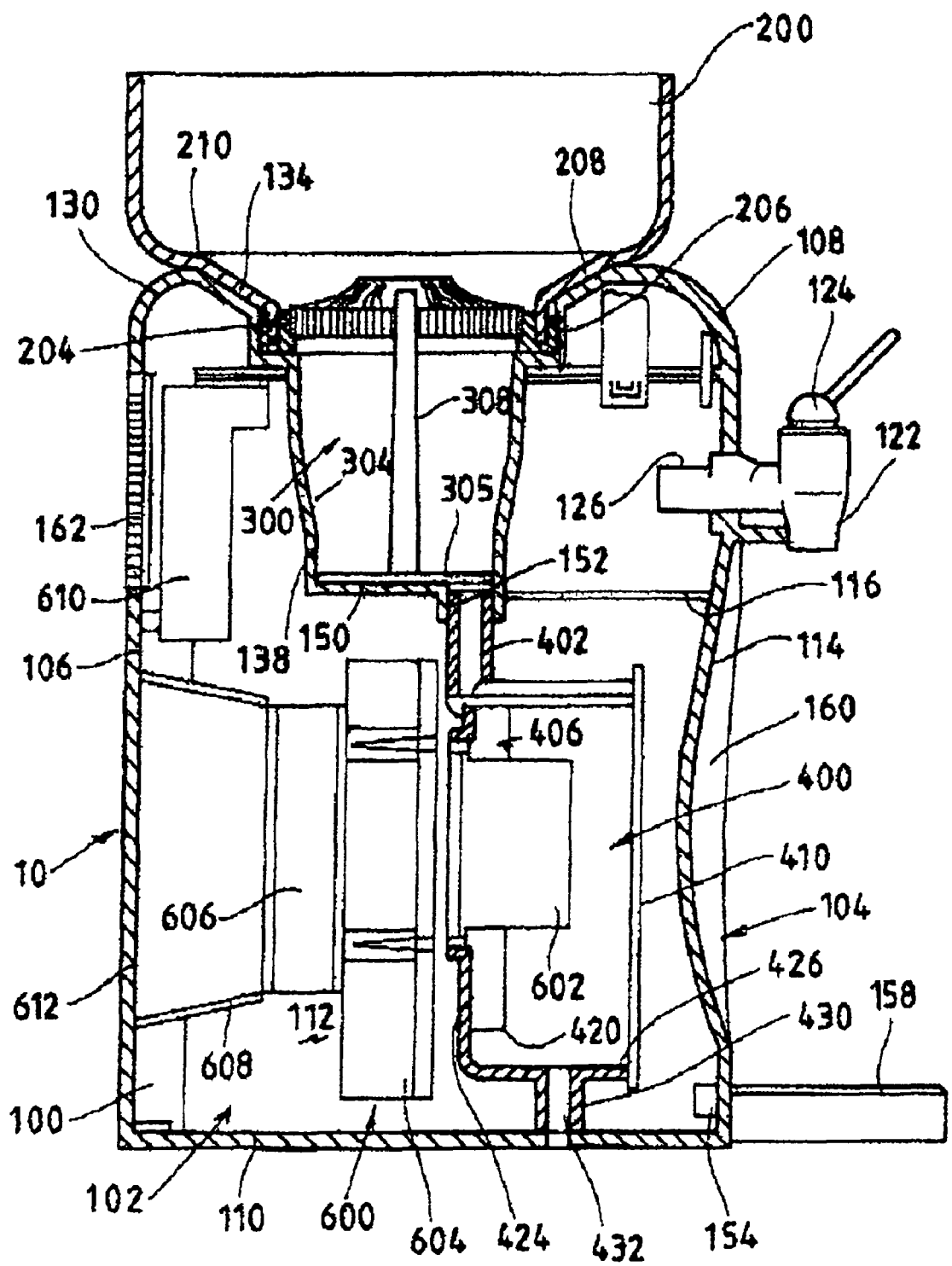
FIG. 2 is a longitudinal section through a cooler of the invention.

Within the housing 102 is a Peltier cooler 600 (see FIG. 2). This comprises a main chiller sink 602 which protrudes through the opening 422 into the chiller tank 400 to cool the water in the tank. There is a heat sink 604 behind the sink 602. A fan indicated at 606 is provided to cool the heat sink 602. A fan cowling 608 is formed integrally with the rear wall 106 and vents 610 are provided within the area bound by the cowling 608.

A PC Board 610 carrying the controls for the cooler 600 is located at the upper part of the rear wall 106.

The reservoir 200 is a blow moulded five liter bottle having an enlarged mouth 204 at its upper end. The mouth 204 comprises an externally threaded cylindrical neck 206 with a belled portion 208 leading to the top surface 210 of the bottle 202.

A valve device 212 (see FIG. 7) is provided in the mouth 204. The device 212 has coaxial cylindrical inner and outer walls 214 and 216, the inner 214 of which is longer than the outer wall 216. The walls are joined by a rounded end 218. The outer wall 216 has internal screw threads which are adapted to mesh with the screw threads on the neck 206 to form a removable cap for the bottle 200. The inner wall 216 has an inwardly directed flange 220 at its lower end.

A valve member 222 is provided. The valve member 222 comprises a cylindrical side portion 224 leading to a bottom part 226 having a raised central disk 228 and a concave connecting member 230. The part 226 has a peripheral extension 230 which in the closed position of the valve member 222 rests on and seals against the upper surface of the flange 220. The side portion 224 is comprised by a number of equi-spaced axially extending columns 228 between which are formed outlet openings 234. These columns 228 taper inwardly as shown in FIG. 8.

At the bottom of the inner wall 214 is an outwardly directed flange 238. The inside wall 216 of the closure cap fits closely around the flange 238 which, when the valve member 222 is in the sealing position shown in FIG. 7, seals against the wall below the openings 234 thereby preventing water escaping from the reservoir 200. When the valve member 222 is moved to its open position in which the flange 238 butts against the 220, the openings 234 will be open to the interior of the reservoir and water can escape therethrough into the water reception chamber and on to the upper surface 318 of the of the filter 300.

The height of the central portion 228 of the valve 212 above the flange 230 is less than the height of the outer surface 320 of the filter cap 314.

A pair of openings are provided at the lower end of the front face 114 of the housing. These respectively receive a pair of pins 154 on a drip tray 158 which is located below the water outlet 122 and provides a stand for a glass or the like to receive water from the cooler 10. The front wall 114 has a tear drop shaped indentation 160 below the spigot 122 which serves both to give the water cooler 10 an aesthetically pleasing appearance and also to reinforce the front wall 114.

The rear wall 106 is provided with additional vents 162 at its upper portion to cool the PC board 610. These vents 162 are a wavy shape to be aesthetically pleasing. The rear member consists of rounded side walls with inward extensions that can fit within the edges of the side walls 112 of the frame.

In use, the reservoir valve 212 is removed and the reservoir bottle 200 is filled with water. The valve 212 is replaced and the valve member 222 moved to its closed position. The reservoir 200 is now brought to the main unit 100. It is inverted and located on the top surface 132. The neck 206 projects into the lead-in portion 134. As it is placed in position, the central part 320 of the cover member 314 of the filter cup 302 engages the centre disk 228 of the valve member 222 causing it to move upwardly to the open position thereby exposing the openings 234 around it. At the same time the rounded connector end 218 fits into the groove 312 in the flange 310 and seals the cap 212 thereagainst. Water will now pass through the openings 234, through the cover member 314 of the filter cup 302, through the filter medium and down through the base 306 thereof where it is discharged on to the base 158 of the receptacle 138. The water then passes through the boss 152 into the inlet tube 402 of the tank 400, eventually filling the tank 400. The Peltier cooling device 600 will cool the water in the tank. When the user wishes to draw off water, he operates the outlet controls 124 and water will be forced up the delivery tube 406 through the delivery pipe to the outlet member 122 and water can then be drawn off. Water is now drawn off from the reservoir to replenish the tank.

On the bottom end of the reservoir 200, there is a recess within which is rotatably received a dial (not shown). Each time an operator refills the reservoir 200 he turns the dial 242 one unit. The size of the dial is such that when it completes a rotation indicated by suitable markings the user will know that the filter 300 must be replaced.

Referring now to FIG. 12 there is shown a modified miniature water cooler of the invention. This water cooler comprises a main unit 700 and a removable water reservoir (not shown) that is in the same form as is described above.

The main unit 700 is generally the same as the unit 100. It includes a hollow housing 702 of square cross-section covered by a top member 704 having a large central opening which is closed by a removable central member 706 that serves as a support for a water reservoir. Below the central member 706 there is a substantially horizontal but concave frusto-conical plate 708 connected to the top member 704 by upwardly extending integral peripheral vertical walls 710. At the centre of the plate 708 is an opening that is the mouth 712 of a tapering sided cup shaped filter receptacle 714 which is substantially identical to the receptacle 138.

The central member 706 has a concave portion 716 in the form of an inverted dome. At the centre of the dome is an opening leading to a tapering substantially cylindrical receiving cup 718 having a short annular inward flange 720 at its lower end which rests on the plate 708 adjacent the mouth 712 of the filter receptacle 714.

An annular over flow chamber 722 is provided being defined between the walls 710, the cup 718, the lower surface of the concave portion 716 and the plate 708. An opening passes between the flange 720 and the plate 708 connecting the interior of the receptacle 714 to the chamber 722.

A filter 300 is received within the receptacle 714. The flange 310 of the filter cup rests on the flange 720 and the tapering configuration of the filter cup holds the base 306 of the filter spaced from the base 724 of the receptacle. A boss 726 similar to the boss 152 connects the base of the receptacle to the interior hydraulic passages and tank within the water cooler.

The central member 706 is connected to the to the top member 704 by releasable clips (one of which is indicated at 728) so as to be removable for the reason set forth below.

In use, the reservoir is placed on the central member 706 with the closure cap entering the upper end of the cup 718. The top surface 320 of the filter 300 engages the valve member of the reservoir moving it within the closure cap into the open position. Water enters the filter 300 through the openings 323. The water passing through the filter enters the interior of the main unit as described above. The water will continue to flow out of the reservoir until the hydraulic passages and tank are filled. As water is drawn off through the dispensing spout 730, water will flow from the reservoir into the tank and air in the tank will enter reservoir. This continues until the tank is once more filled.

In certain circumstances, the ambient temperature where the water cooler is located may be warm. This may cause the air in the reservoir to expand and the water in the reservoir will be expelled through the valve. Because there is no other place for this expelled water to be accommodated within the cooler, the water enters into the space between the bases 306 and 724. This water will lift the filter 300 within the receptacle and water will pass between the flange 720 and the plate 708 into the overflow tank 722. The tank 736 will accommodate the water being expelled and prevents water spillage from the water cooler.

When ambient temperature drops and the air in the reservoir returns to its normal volume, the water will be drawn back from the overflow tank 722.

By having the central member 706 formed separately of the top part 704, the central member 706 can be temporally removed for cleaning the interior of the overflow tank 736.

I have found that the water cooler 10 above described is an extremely satisfactory, economical and aesthetically pleasing unit which provides filtered water.

The user will know when to replace the filter by operating the dial or by any other convenient means so that quality water is dispensed by the water cooler.

I have further found that the shape of the columns 232 is such as to ensure that there is a satisfactory water supply from the reservoir 200 to the tank 400 without the necessity of an air vent being provided for the reservoir.

It is appreciated that certain features of the invention, which are, for clarity, described in the context of separate embodiments may also be provided in combination in a single embodiment. Conversely various features of the invention which are for brevity described in the context of a single embodiment may also be provided separately or in any suitable combination The invention is not limited to the precise constructional details hereinbefore described and illustrated in the drawings.

The invention claimed is:

1. A water cooler adapted for use with a reservoir having an outlet mouth within which is a normally closed closure valve that is movable to an open position in which it exposes delivery ports at the mouth, wherein the water cooler comprises:
   a tank that is connected to an outlet spout from which water is dispensed,
   a water passage leading to the tank, and
   a support on which the water reservoir may be placed in inverted position to deliver water to the water cooler, the support including an inlet that in use is connected to the water reservoir and that communicates with the water passage to deliver water to the tank, and a removable filter located in the water passage between the port and the inlet, the filter being shaped with an upwardly projecting portion which is capable of engaging the closure valve to move it into the open position when the reservoir is placed in position on the cooler.

2. A water cooler as claimed in claim 1 including a cup shaped receptacle in which the filter is releasably received.

3. A water cooler as claimed in claim 2 wherein the filter comprises a cup shaped member having a cover thereon and with a base therebelow and wherein filtration media is received in the cup shaped member.

4. A water cooler as claimed in claim 3 wherein the filter and the receptacle both comprise bases and these two bases are slightly spaced so that water passing through the filter will be received on the base of the receptacle.

5. A water cooler as claimed in claim 4 wherein the receptacle has a base which is provided with an outlet opening that is connected to the inlet on the tank.

6. A water cooler as claimed in claim 2 wherein at the top of the receptacle there is an upwardly directed surface and the filter has a surrounding flange which rests on the surface to support the filter within the receptacle.

7. A water cooler as claimed in claim 6 wherein an outer edge of the flange is upwardly inclined to give the flange a degree of flexibility so as to seal effectively against the upwardly directed surface.

8. A water cooler as claimed in claim 1 having a removable filter located in the water passage, wherein the filter comprises a cover member with a central upwardly projecting portion which is capable of engaging the closure valve to move it into the open position when the reservoir is placed in position on the cooler.

9. A water cooler as claimed in claim 8 wherein an axially extending reinforcing pillar is provided in the filter to reinforce the projecting portion.

10. A water cooler as claimed in claim 3 wherein the cover has very small or microscopic openings therein through which water enters into the cup shaped member.

11. A water cooler as claimed in claim 3 wherein the base has very small or microscopic openings therein through which water escapes from the cup shaped member.

12. A water cooler comprising
    a tank having a base, sides and an upper part, the tank being connected to an outlet spout from which water is dispensed,
    a water passage leading to the tank, and
    a support on which an inverted water reservoir may be placed to deliver water to the water cooler, the support including
    an inlet that in use is connected to the water reservoir and that communicates with the water passage to deliver water to the tank and
    a removable filter located in the water passage between a port and the inlet,
    wherein the tank is formed with first and second upwardly projecting tubes formed integrally therewith,
    the first tube being at the upper part of the tank with its mouth constituting the inlet and
    the second tube being at the side of the tank and being open near the base of the tank to constitute a delivery tube.

13. A water cooler as claimed in claim 12 wherein the second tube is connected by a flexible pipe to the outlet spout.

14. A water cooler as claimed in claim 13 wherein a cooling device is provided adjacent the tank.

15. A water cooler as claimed in claim 14 wherein this cooling device is a Peltier cooler having a cooling plate, and wherein the tank is formed with an enlarged aperture in which the cooling plate is received.

16. A water cooler comprising
    a tank having an interior that is connected to an outlet spout from which water is dispensed,
    a water passage leading to the tank, and
    a support on which an inverted water reservoir may be placed to deliver water to the water cooler, the support including an inlet chamber that in use is connected to the inverted water reservoir and that communicates with the water passage to deliver water to the tank,
    a removable filter located in the water passage, and
    an overflow tank connected to the inlet chamber so that when excess water enters the inlet chamber this is conveyed to the overflow tank.

17. A water cooler as claimed in claim 16 wherein the reservoir comprises a valve which is openable by contact with a part in the water cooler when the tank is connected to the port.

18. A water cooler as claimed in claim 16 wherein the support comprises a cover for the overflow tank and is optionally movable to expose the interior of the tank for cleaning.

19. The combination of a water cooler and a water reservoir, wherein the water cooler comprises
    a tank that is connected to an outlet spout from which water is dispensed,
    a water passage leading to the tank, and
    a support on which the water reservoir when inverted may be placed to deliver water to the water cooler, the support including
    an inlet that in use is connected to the inverted water reservoir and that communicates with the water passage to deliver water to the tank and
    a removable filter located in the water passage between a port and the inlet, and wherein the water reservoir mounted on the support and is connected to the water passage, the water reservoir having an enlarged outlet mouth within which is a closure valve incorporating a valve member that is movable from a sealing position to an open position in which it permits water to flow through the valve.

* * * * *